US011620275B2

(12) United States Patent
Chen et al.

(10) Patent No.: US 11,620,275 B2
(45) Date of Patent: Apr. 4, 2023

(54) MULTI-TEXT INTERCONNECTION

(71) Applicant: International Business Machines Corporation, Armonk, NY (US)

(72) Inventors: Dong Chen, Beijing (CN); Peng Hui Jiang, Beijing (CN); Jing Bai, Beijing (CN); Ting Ting Zhan, Beijing (CN); Xiaoli Duan, Beijing (CN); Jun Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 17/412,353

(22) Filed: Aug. 26, 2021

(65) Prior Publication Data

US 2023/0068592 A1 Mar. 2, 2023

(51) Int. Cl.
*G06F 16/22* (2019.01)
*G06F 16/23* (2019.01)

(52) U.S. Cl.
CPC ...... *G06F 16/2365* (2019.01); *G06F 16/2282* (2019.01)

(58) Field of Classification Search
None
See application file for complete search history.

(56) References Cited

U.S. PATENT DOCUMENTS

| | | | |
|---|---|---|---|
| 6,516,327 B1 | 2/2003 | Zondervan et al. | |
| 7,386,575 B2 | 6/2008 | Bashant et al. | |
| 9,967,285 B1 * | 5/2018 | Rossman | G06F 16/22 |
| 10,057,207 B2 * | 8/2018 | Kaliski, Jr. | G06F 16/245 |
| 11,269,808 B1 * | 3/2022 | Yuan | G06F 16/164 |
| 11,544,282 B1 * | 1/2023 | Chor | G06F 16/248 |
| 2018/0089259 A1 * | 3/2018 | James | G06F 16/2425 |
| 2019/0095478 A1 * | 3/2019 | Tankersley | G06F 16/288 |
| 2020/0257680 A1 * | 8/2020 | Danyi | G06F 11/302 |

(Continued)

FOREIGN PATENT DOCUMENTS

CN 102368267 A 3/2012

OTHER PUBLICATIONS

Anonymous,"Conflict Resolution Concepts and Architecture." Oracle® Database Advanced Replication10g Release 1. Jun. 28, 2021. 29 Pages.

(Continued)

*Primary Examiner* — Wilson Lee
(74) *Attorney, Agent, or Firm* — Cantor Colburn LLP; Teddi Maranzano

(57) ABSTRACT

Embodiments of the invention are directed to synchronous multi-point update of associated text. Aspects include receiving, from a user, a request to associate a first text with one or more other instances of the first text and looking up the first text in a text association table. Based on determining that no entry in the text association table corresponds to the first text, aspects include creating an entry in the text association table corresponding to the first text. Aspects also include adding an address of the first text to the entry in the text association table. Based on detecting a change to one of the first text and one of the one or more other instances of the first text, aspects further include updating the first text and each of the one or more other instances of the first text that was not changed.

20 Claims, 7 Drawing Sheets

(56) References Cited

U.S. PATENT DOCUMENTS

2021/0182261 A1* 6/2021 Yeo .................... H04L 9/0656
2023/0004573 A1* 1/2023 Rupanagudi ........ H04L 63/0209

OTHER PUBLICATIONS

B. Clark. "How to Use Linked Text to Update Multiple Word Documents." https://www.howtogeek.com/695409/how-to-use-linked-text-to-update-multiple-word-documents. Nov. 26, 2020. 4 Pages.
I. Ahmed, "Multi-Master Replication Solutions for PostgreSQL" https://www.percona.com/blog/2020/06/09/multi-master-replication-solutions-for-postgresql. Published Date: Jun. 9, 2020. 8 Pages.

* cited by examiner

MULTI-TEXT INTERCONNECTION

BACKGROUND

The present invention generally relates to the interconnection of text in multiple locations, and more specifically, to synchronous multi-point updates of associated texts.

Often a piece of text appears in multiple locations across one or more servers, databases, or documents, and when a change is made to that text, it needs to be changed in each of the locations. Such text includes, but is not limited to, machine IP information, date information in the schedule, and so on. Currently, when such a text is updated, a user must modify the text in each of the locations one by one. In some cases, failure to timely update the text in all of the locations can cause the user's operation to be interrupted, or the information will lag due to the inconsistent information records.

SUMMARY

Embodiments of the present invention are directed to a computer-implemented method for synchronous multi-point updates of associated texts. A non-limiting example of the computer-implemented method includes receiving, from a user, a request to associate a first text with one or more other instances of the first text and looking up the first text in a text association table. Based on determining that no entry in the text association table corresponds to the first text, the method further includes creating an entry in the text association table corresponding to the first text. The method also includes adding an address of the first text to the entry in the text association table. Based on detecting a change to one of the first text and one of the one or more other instances of the first text, the method further includes updating the first text and each of the one or more other instances of the first text that was not changed.

Embodiments of the present invention are directed to a system for synchronous multi-point updates of associated texts. A non-limiting example of the system includes a processor communicative coupled to a memory, the processor operable to receive, from a user, a request to associate a first text with one or more other instances of the first text and look up the first text in a text association table. The processor is also operable to create an entry in the text association table corresponding to the first text based on determining that no entry in the text association table corresponds to the first text. The processor is further operable to add an address of the first text to the entry in the text association table. The processor is further operable to update the first text and each of the one or more other instances of the first text that was not changed based on detecting a change to one of the first text and one of the one or more other instances of the first text.

Embodiments of the invention are directed to a computer program product for synchronous multi-point update of associated text, the computer program product comprising a computer readable storage medium having program instructions embodied therewith. The program instructions are executable by a processor to cause the processor to perform a method. A non-limiting example of the method includes receiving, from a user, a request to associate a first text with one or more other instances of the first text and looking up the first text in a text association table. Based on determining that no entry in the text association table corresponds to the first text, the method further includes creating an entry in the text association table corresponding to the first text. The method also includes adding an address of the first text to the entry in the text association table. Based on detecting a change to one of the first text and one of the one or more other instances of the first text, the method further includes updating the first text and each of the one or more other instances of the first text that was not changed.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
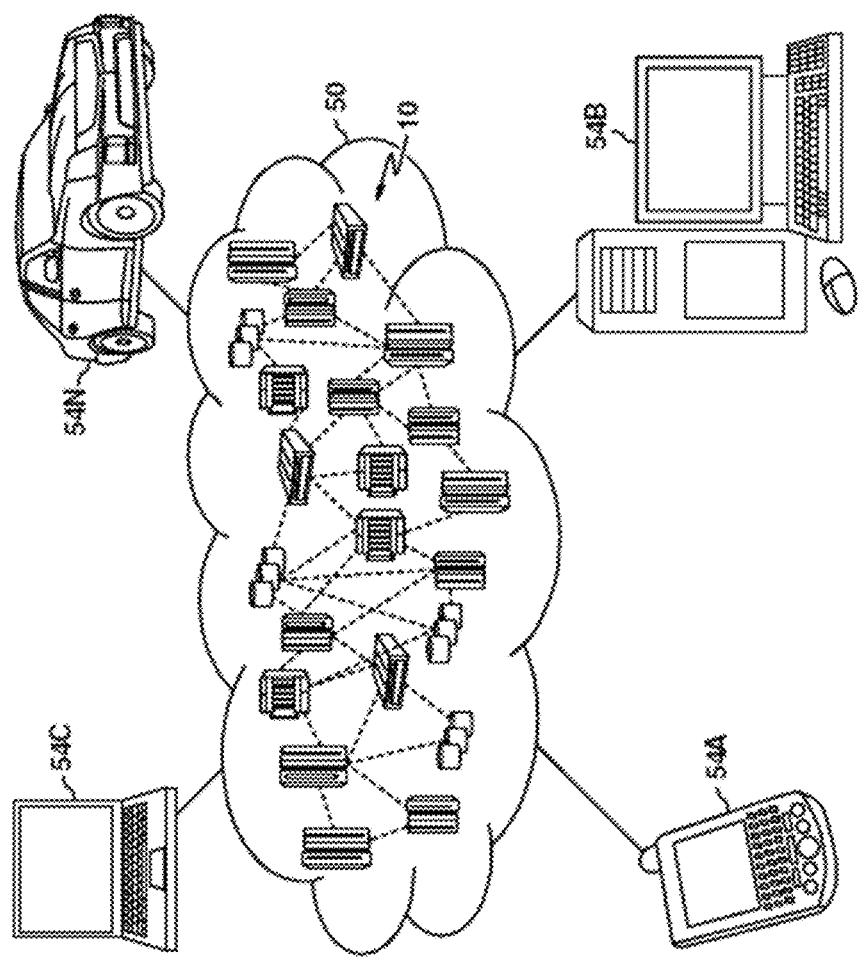
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, often a piece of text appears in multiple locations across one or more servers, databases, or documents, and when a change is made to that text, it needs to be changed in each of the locations. Currently, when such a text is updated, a user must modify the text in each of the locations one by one. In exemplary embodiments, methods, systems, and computer program products for synchronous multi-point updating of associated text are provided. In exemplary embodiments, the synchronous multi-point updating of associated text establishes an association between multiple instances of a text-based on input from a user. In addition, when a user updates any instance of the associated text, all of the remaining instances of the associated text are automatically updated.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
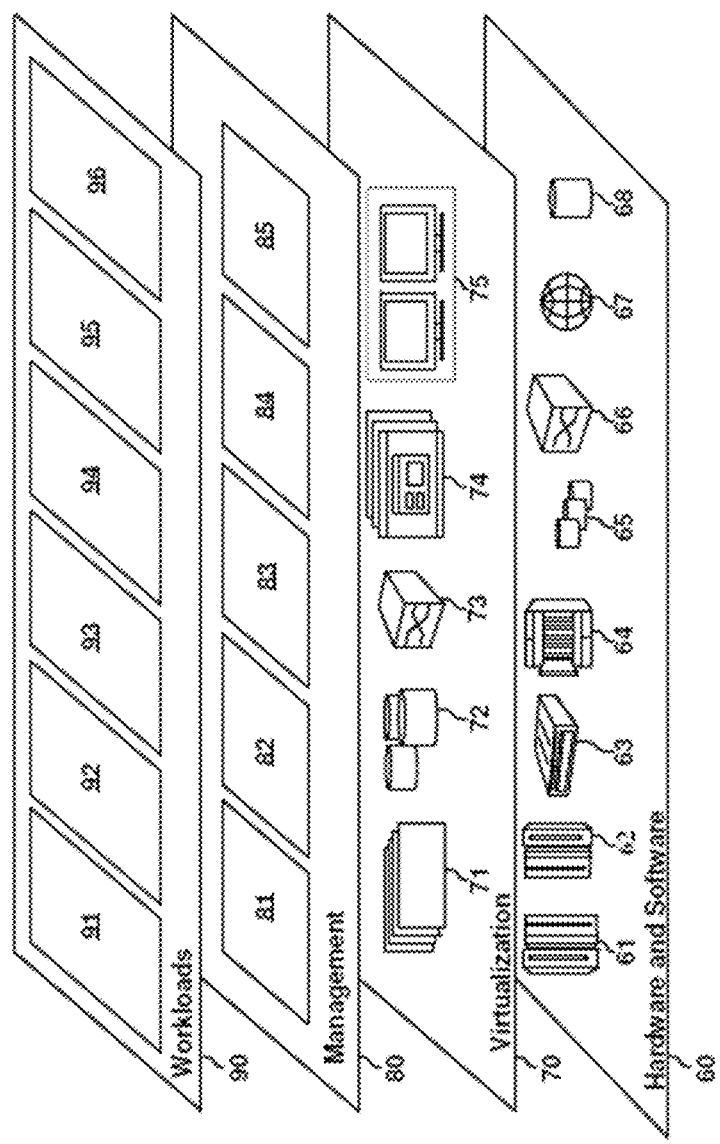
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and synchronous multi-point update of associated text 96.

Figure 3:
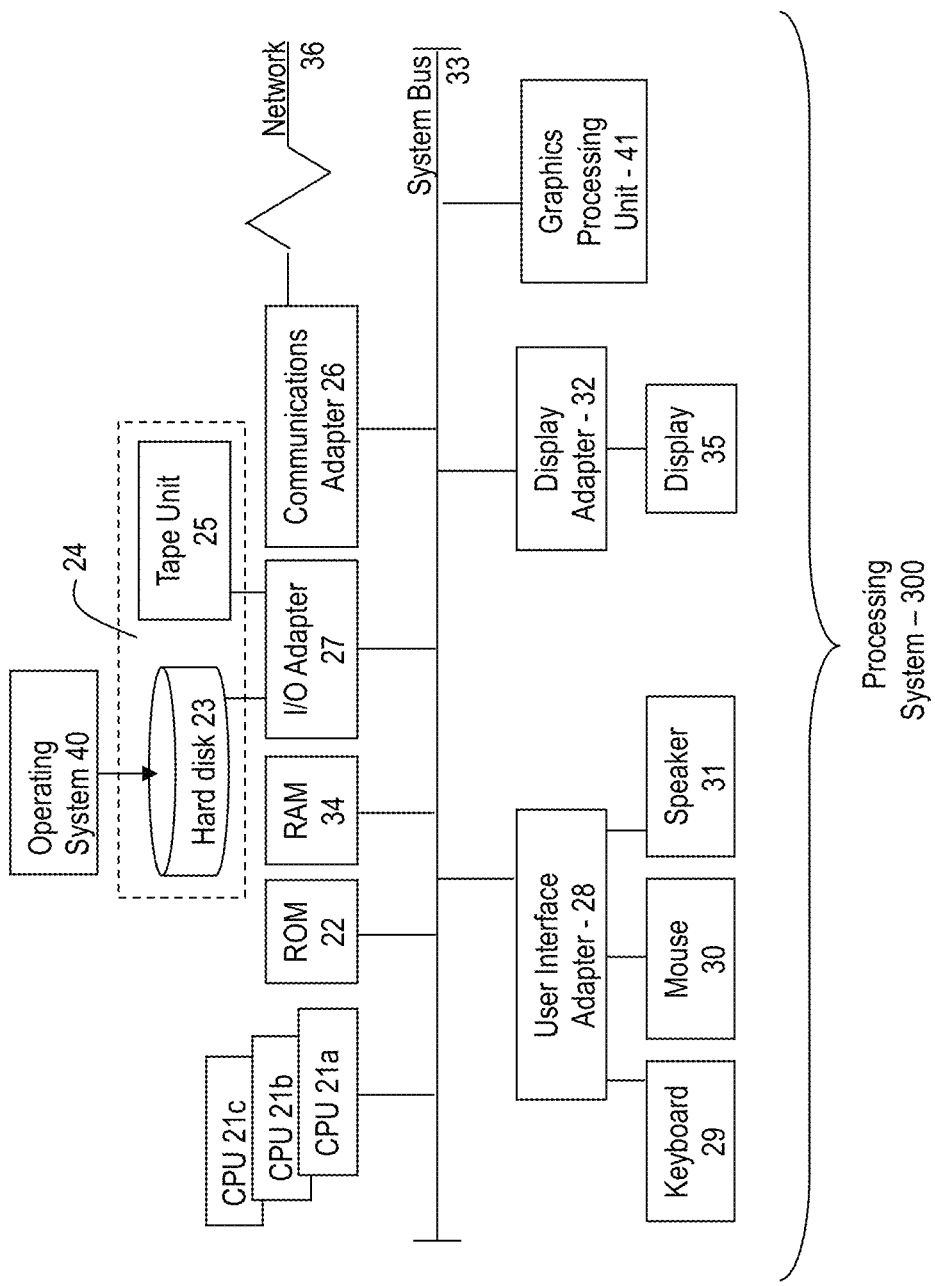
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system to coordinate the functions of the various components shown in FIG. 3.

Turning now to a more detailed description of aspects of the present invention, methods, systems, and computer program products for synchronous multi-point updating of associated text are provided. In exemplary embodiments, the synchronous multi-point updating of associated text establishes an association between multiple instances of a text-based on input from a user. In addition, when a user updates any instance of the associated text, all of the remaining instances of the associated text are automatically updated.

Figure 4:
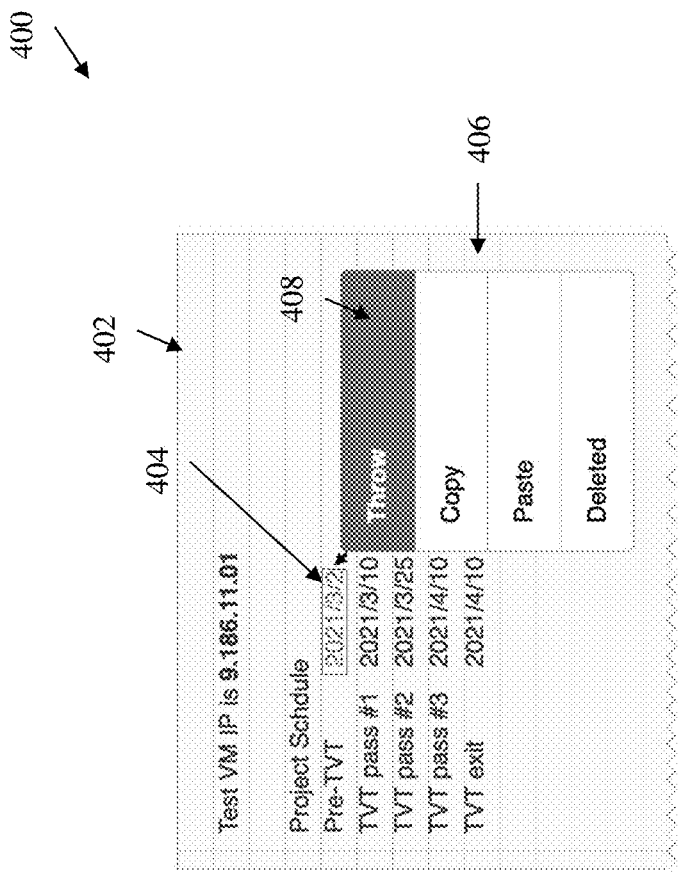
FIG. 4 depicts an illustration of a user interface for performing synchronous multi-point update of associated text according to embodiments of the invention.

Referring now to FIG. 4 an illustration of a user interface 400 for performing synchronous multi-point update of associated text according to embodiments of the invention is shown. In exemplary embodiments, the user interface is a display of a computing system that can be implemented on the processing system 300 found in FIG. 3 or as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

As illustrated the user interface 400 includes a text editing software 402 that is used by a user to enter and edit the text in a variety of formats. The text editing software 402 allows a user to select, or highlight, a first text 404. The text editing software 402 includes a menu 406 that is displayed when a user selects the first text 404 and executes an action, such as a left click, right-click, a double click on a mouse. In exemplary embodiments, the menu 406 includes a throw 408 action, that is used to create and/or update an association between the first text 404 and other instances of the first text 404 that are identified by the user. In exemplary embodiments, the user can also execute the throw action by selecting the first text 204 and then performing a keyboard shortcut, such as pressing CNTRL+T. Once the first text 404 is selected and the throw action 408 is initiated, the first text 408 and a memory address associated with the first text 408 are copied to a clipboard, or another temporary memory location, and a text association table is obtained.

Figure 5:
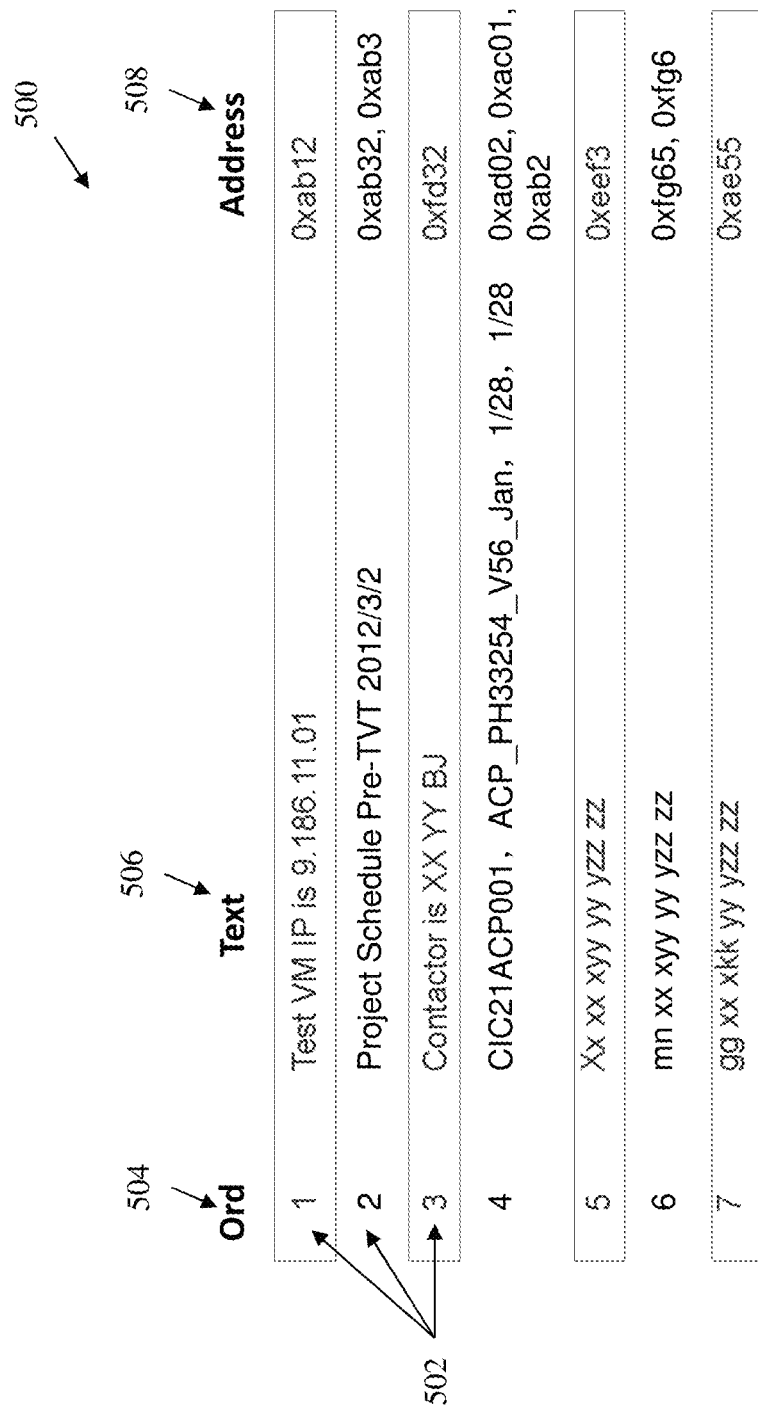
FIG. 5 depicts an illustration of a text association table for performing synchronous multi-point update of associated text according to embodiments of the invention.

Referring now to FIG. 5, an illustration of a text association table 500 for performing synchronous multi-point update of associated text according to embodiments of the invention is shown. As illustrated, the text association table 500 includes a plurality of entries 502 that each include an order 504, also referred to herein as a priority of the entry, a text 506 associated with the entry, and one or more addresses 508. In exemplary embodiments, when a user initiates a throw action, as shown in FIG. 4, the first text 408 is compared with the text 506 of each entry 502 in the text association table 500. If the first text 408 matches the text 506 of an entry, the address associated with the first text 408 is added to the address 508 of the entry. Otherwise, a new entry 502 is created and the text 506 is set as the first text 408, and the address associated with the first text 408 is added to the address 508 of the new entry.

In exemplary embodiments, the address 508 stores a location of each instance of the text 506 that the user has associated and any change to the text located at one of the addresses will automatically trigger a corresponding change to the text at each of the other addresses. In exemplary embodiments, each address stored in the address 508 field identifies a location of a file that includes the text 506 and a location of the text 506 within the file. In one embodiment, the location of the file includes a network location, a file storage path, and a file name for the file.

In one embodiment, the priority 504 of each entry is determined based on how recently each entry was created and/or updated. For example, the time since an entry of the text association table was last updated is used to determine the prioritization level, or order of the entry. In one embodiment, more recently created or updated entries have a higher prioritization level than less recently updated entries. In other embodiments, a user may manually set the order 504 or may select a set of criteria that are used to determine the order 504.

Figure 6:
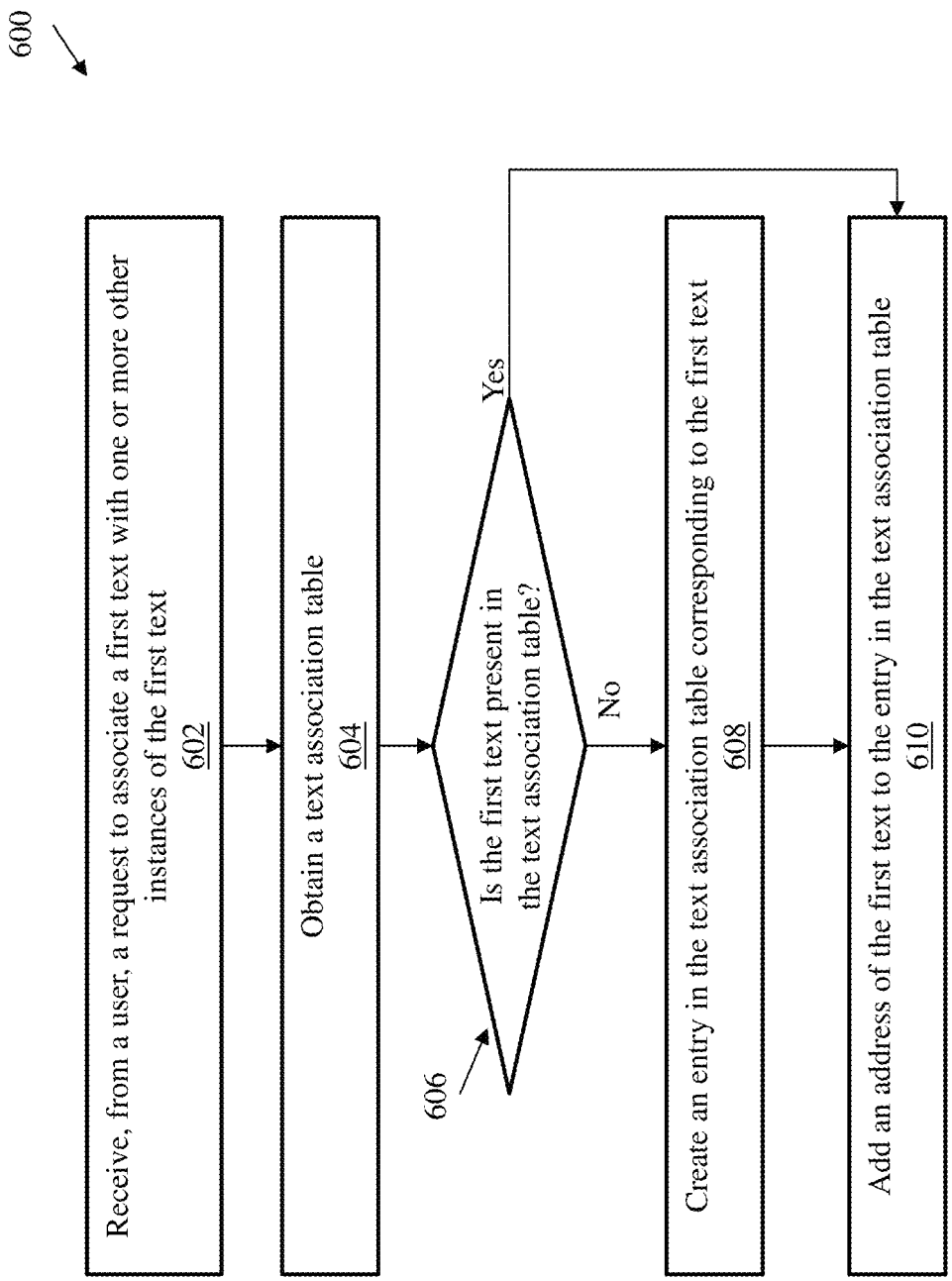
FIG. 6 depicts a flow diagram of a method for initiating a synchronous multi-point association for associated text according to one or more embodiments of the invention.

Referring now to FIG. 6, a flow diagram of a method 600 for initiating a synchronous multi-point association for associated text according to one or more embodiments of the invention is shown. As shown at block 602, the method 600 includes receiving, from a user, a request to associate the first text with one or more other instances of the first text. Next, the method 600 includes obtaining a text association table, as shown at block 604. In exemplary embodiments, the text association table includes a plurality of entries and each entry includes a corresponding text and an address of each instance of the corresponding text that is associated with the entry. In exemplary embodiments, the address of each instance of the corresponding first text is added to the text association table based upon a user request to associate the corresponding first text with one or more other instances of the corresponding text.

Next, as shown at decision block 606, the method 600 includes determining if the first text is present in an entry of the text association table. In one embodiment, determining that an entry in the text association table corresponds to the first text includes determining that the entry in the text association table has a text that is an exact match for the first text. In another embodiment, determining that an entry in the text association table corresponds to the first text includes determining that the entry in the text association table has a text that is has a consistency with the first text that exceeds a threshold level. If the first text is not present in an entry of the text association table, the method proceeds to block 608 and includes creating an entry in the text association table corresponding to the first text. Then, as shown at block 610, the method 600 includes adding the address of the first text to the entry in the text association table.

In exemplary embodiments, determining that the entry in the text association table has a text that is has a consistency with the first text that exceeds a threshold level includes performing an approximate string-matching algorithm to compare the first text to the text of each entry in the text association table. In one embodiment, the string-matching algorithm calculates an edit distance for each comparison. The edit distance is a measure of the closeness of a match is measured in terms of the number of primitive operations necessary to convert the string into an exact match. The lower the edit distance is the greater the match between the first text and the text of the entry. In one embodiment, a percentage match is determined by subtracting the edit distance from a number of characters in the first text and dividing the result by the number of characters in the first text. This percentage match is then compared to the threshold level, which may be set by the user.

Figure 7:
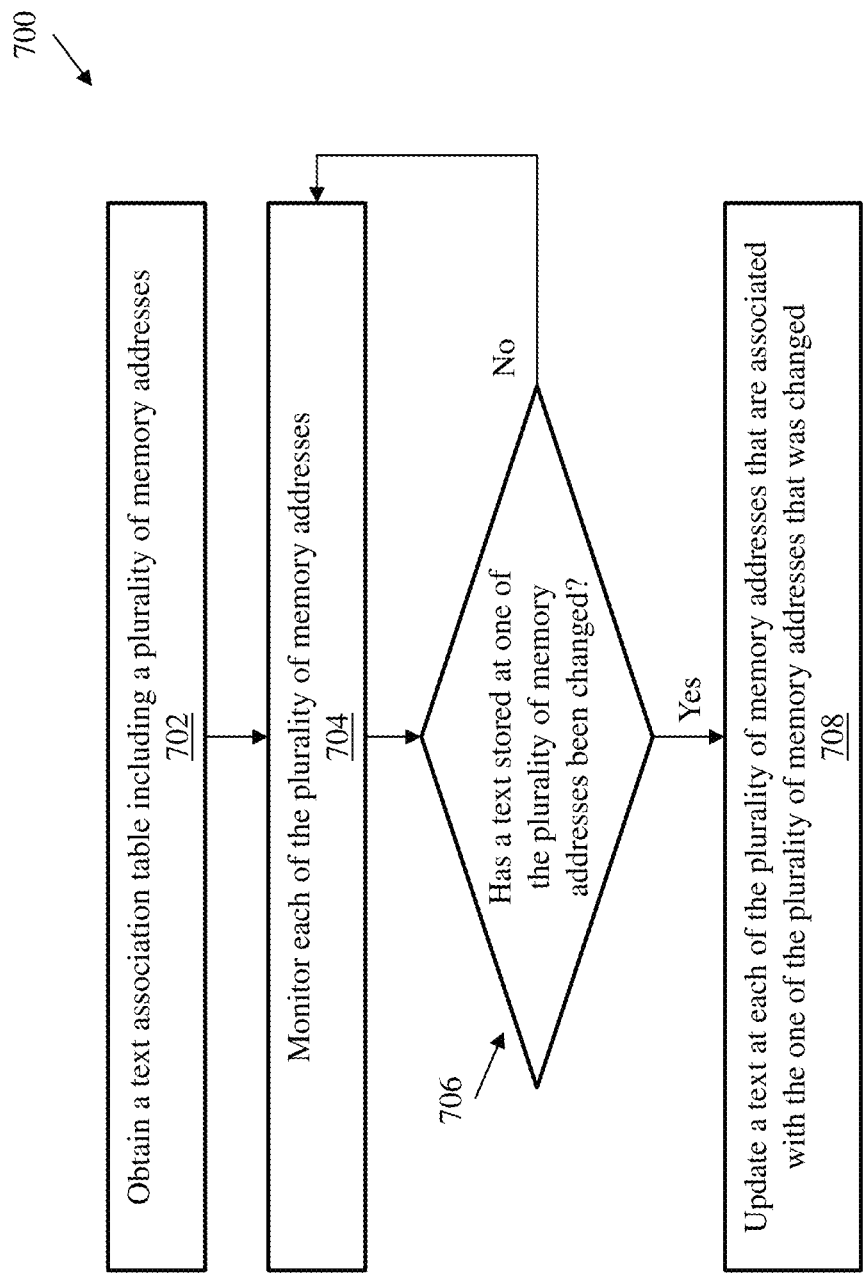
FIG. 7 depicts a flow diagram of a method for synchronous multi-point updating of associated text according to one or more embodiments of the invention.

Referring now to FIG. 7 a flow diagram of a method 700 for synchronous multi-point updating of associated text according to one or more embodiments of the invention is shown. As shown at block 702, the method 700 includes obtaining a text association table including a plurality of memory addresses. The method 700 also includes monitoring each of the plurality of memory addresses, as shown at block 704. Next, at decision block 706, the method 700 includes determining whether a text stored at one of the plurality of memory addresses been changed. If a text stored at one of the plurality of memory addresses been changed, the method proceeds to block 708 and updates a text at each of the plurality of memory addresses that are associated with the one of the plurality of memory addresses that was changed. If no change in a text stored at one of the plurality of memory addresses been is detected, the method 700 returns to block 704.

Technical benefits of synchronous multi-point update of associated text include an effective and convenient way to update an associated text stored in multi-places without requiring manual replacement by the user. Furthermore, the synchronous multi-point update of associated text improves the operation of traditional text linkages with rely on a master/slave relationship in which only an update of a master text will trigger an update of the slave text. Additional processes may also be included. It should be understood that the processes depicted in FIGS. 6 and 7 represent illustrations and that other processes may be added, or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for synchronous multi-point update of associated text, the method comprising:
   receiving, from a user, a request to associate a first text with one or more other instances of the first text;
   looking up the first text in a text association table;
   based on determining that no entry in the text association table corresponds to the first text, creating an entry in the text association table corresponding to the first text;
   adding an address of the first text to the entry in the text association table; and
   based on detecting a change to one of the first text and one of the one or more other instances of the first text, updating the first text and each of the one or more other instances of the first text that was not changed.

2. The computer-implemented method of claim 1, wherein determining that no entry in the text association table corresponds to the first text includes determining that no entry in the text association table has a text that is an exact match for the first text.

3. The computer-implemented method of claim 1, wherein determining that no entry in the text association table corresponds to the first text includes determining that no entry in the text association table has a text that is has a consistency with the first text that exceeds a threshold level.

4. The computer-implemented method of claim 1, wherein each entry of the text association table includes a corresponding text and an address of each instance of the corresponding text.

5. The computer-implemented method of claim 4, wherein the address of each instance of the corresponding first text is added to the text association table based upon a user request to associate the corresponding first text with one or more other instances of the corresponding text.

6. The computer-implemented method of claim 4, wherein each entry of the text association table further includes a prioritization level.

7. The computer-implemented method of claim 6, wherein a time since an entry of the text association table was last updated is used to determine the prioritization level such that more recently updated entries have a higher prioritization level than less recently updated entries.

8. A system comprising:
   a processor communicatively coupled to a memory, the processor configured to:
      receive, from a user, a request to associate a first text with one or more other instances of the first text;
      look up the first text in a text association table;
      based on determining that no entry in the text association table corresponds to the first text, create an entry in the text association table corresponding to the first text;
      add an address of the first text to the entry in the text association table; and
      based on detecting a change to one of the first text and one of the one or more other instances of the first text, update the first text and each of the one or more other instances of the first text that was not changed.

9. The system of claim 8, wherein determining that no entry in the text association table corresponds to the first text includes determining that no entry in the text association table has a text that is an exact match for the first text.

10. The system of claim 8, wherein determining that no entry in the text association table corresponds to the first text includes determining that no entry in the text association table has a text that is has a consistency with the first text that exceeds a threshold level.

11. The system of claim 8, wherein each entry of the text association table includes a corresponding text and an address of each instance of the corresponding text.

12. The system of claim 11, wherein the address of each instance of the corresponding first text is added to the text association table based upon a user request to associate the corresponding first text with one or more other instances of the corresponding text.

13. The system of claim 12, wherein each entry of the text association table further includes a prioritization level.

14. The system of claim 13, wherein a time since an entry of the text association table was last updated is used to determine the prioritization level such that more recently updated entries have a higher prioritization level than less recently updated entries.

15. A computer program product for synchronous multi-point update of associated text comprising a computer readable storage medium having program instructions embodied therewith, the program instructions executable by a processor to cause the processor to perform a method comprising:
   receiving, from a user, a request to associate a first text with one or more other instances of the first text;
   looking up the first text in a text association table;
   based on determining that no entry in the text association table corresponds to the first text, creating an entry in the text association table corresponding to the first text;
   adding an address of the first text to the entry in the text association table; and
   based on detecting a change to one of the first text and one of the one or more other instances of the first text, updating the first text and each of the one or more other instances of the first text that was not changed.

16. The computer program product of claim 15, wherein determining that no entry in the text association table corresponds to the first text includes determining that no entry in the text association table has a text that is an exact match for the first text.

17. The computer program product of claim 15, wherein determining that no entry in the text association table corresponds to the first text includes determining that no entry in the text association table has a text that is has a consistency with the first text that exceeds a threshold level.

18. The computer program product of claim 15, wherein each entry of the text association table includes a corresponding text and an address of each instance of the corresponding text.

19. The computer program product of claim 18, wherein the address of each instance of the corresponding first text is added to the text association table based upon a user request to associate the corresponding first text with one or more other instances of the corresponding text.

20. The computer program product of claim 19, wherein each entry of the text association table further includes a prioritization level.

\* \* \* \* \*